(No Model.)
S. D. FIELD.
DUPLEX TELEGRAPH.
No. 262,755. Patented Aug. 15, 1882.
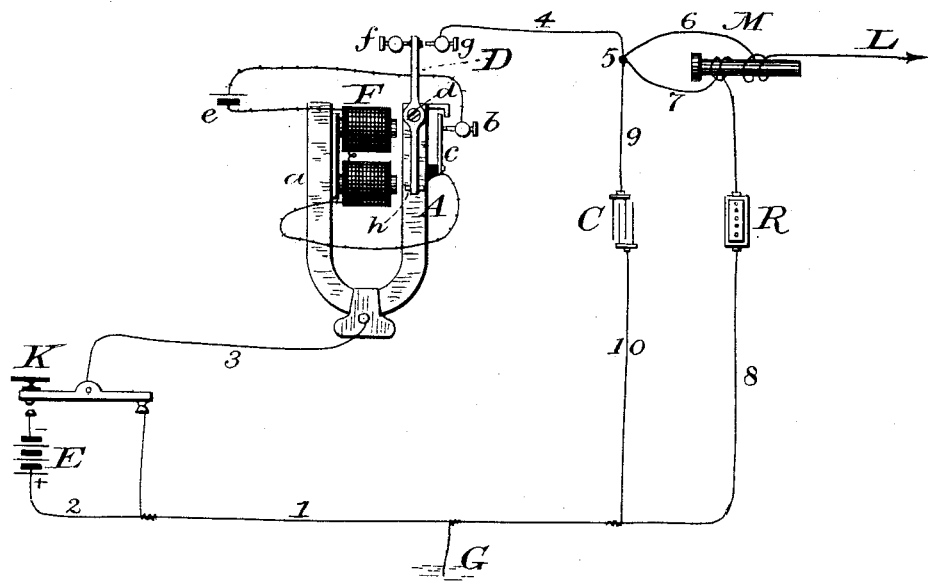
Witnesses:
Mrs. K. Cockwood French,
Miller C. Earl
Inventor,
Stephen D. Field,
by his Attorney.
Frank L. Pope.

UNITED STATES PATENT OFFICE.

STEPHEN D. FIELD, OF NEW YORK, N. Y.

DUPLEX TELEGRAPH.

SPECIFICATION forming part of Letters Patent No. 262,755, dated August 15, 1882.

Application filed April 28, 1881. (No model.)

*To all whom it may concern:*

Be it known that I, STEPHEN D. FIELD, a citizen of the United States, and a resident of the city, county, and State of New York, have invented certain new and useful Improvements in Duplex Telegraphs, of which the following is a specification.

In transmitting two sets of signals simultaneously in opposite directions over a single telegraph-wire by means of a current from the battery at the home station, which is divided between the main line and an artificial line of equal or proportional resistance, much interference and confusion arise from the false signals which are produced upon the home receiving-instrument by discharges of static or induced electricity from the line at the instant the line is disconnected from the battery and connected with the earth by the key at the home station. This phenomenon manifests itself more especially when the line is of considerable length and well insulated. The effect of these return-discharges upon the home receiving-instrument has been counteracted by several devices heretofore used, the general principle common to them all being that of producing a similar discharge from the artificial line, which is effected by giving the latter artificial electro-static capacity equal to or proportional to that of the main line and in causing this discharge to produce an equal and opposite effect upon the receiving-instrument. My invention differs from these in that the neutralization of the inductive effects is produced within or upon the line itself, and they do not therefore affect the receiving-instrument in any manner whatever.

To this end my invention consists in the combination, with the main line, artificial or compensating line and battery at the home station, of an electrotome and a key for connecting the battery simultaneously with the main and artificial lines through the electrotome when a signal is to be transmitted, a receiving-instrument so arranged that the outgoing currents or pulsations in the main and artificial lines produce equal and opposite effects thereupon, which effects neutralize each other in the usual manner and leave the instrument free to respond to the signals from the distant station, and a condenser or equivalent device for the storage of electricity, which has one of its terminals connected directly both to the main and artificial lines at their point of junction, and the other terminal connected to the earth. The invention also consists in certain details of construction of the apparatus, especially of the vibrating rheotome, whereby a more uniform and perfect action is obtained.

The subject-matter herein claimed as new will be specifically designated in the claims at the end of this specification.

In the accompanying drawing I have represented the arrangement of apparatus and circuits at one terminal station of a duplex telegraph-line.

Referring to the drawing, A represents a rheotome, the office of which is to alternately make and break an electric circuit with great rapidity and uniformity. This instrument may be constructed in various ways, the essential point being that the alternate making and breaking of the circuit shall be effected with sufficient rapidity, and that the intervals shall be uniform—that is to say, that the successive periods during which the circuit is alternately interrupted and restored shall be precisely equal to each other. I prefer to employ for this purpose an apparatus arranged upon the principle which I have illustrated in the drawing and which I will now describe.

A tuning-fork, $a$, of well-known construction is clamped to a suitable base, and has an electro-magnet, F, mounted upon one of its limbs, while its remaining limb at the same time acts as an armature to the electro-magnet. $c$ is an insulated spring, mounted upon that limb of the fork which forms the armature. The free end of the spring $c$ presses by its own resiliency against an adjustable fixed contact-stop, $b$, thus closing the circuit of a local battery, $e$, through the electro-magnet F. The attraction of the electro-magnet, when exerted upon the limb of the fork, breaks the contact between the spring $c$ and the fixed stop $b$, and thus demagnetizes the electro-magnet F, whereby the contact between the spring $c$ and the stop $b$ is automatically renewed, and thus the apparatus forms a self-acting interrupter, by means of which the fork $a$ is kept in a state of continuous vibration by the action of the electro-magnet F. The rate of vibration will be definite and uniform, and will depend upon the normal pitch of the fork, while the amplitude of vibration will depend upon the force exerted by the electro-magnet F. The to-and-fro vibrations of the fork $a$ are employed to make and break the circuit of the main line by means of a contact-lever, D, which is mounted upon one limb of the fork. This apparatus constitutes a rheotome, which alternately makes and breaks the circuit of the main line, as hereinafter explained, with a rapidity of succession determined by the normal pitch of the fork. The contact-lever D is preferably constructed in the form shown in the drawing, being mounted or pivoted to the limb of the fork at the point $d$, which is at or near its own center of gravity. The lower end of the contact-lever D is fitted with a friction-spring or other equivalent device, $h$, the object of which is to retain the contact-lever in position, so that it will vibrate with the limb of the fork to which it is attached.

The upper end of the contact-lever $d$ plays between the two adjustable fixed stops $f$ $g$, the amount of play allowed being only just sufficient to permit the circuit to be interrupted between the lever and the contact-point $g$. The effect of this arrangement is that the instant the limb of the fork begins to move toward the electro-magnet F the contact between the lever D and the stop $g$ will be interrupted, and on the other hand the instant the limb begins to move in the opposite direction the contact between D and $g$ will be closed. Consequently the main circuit will remain open during the time the limb of the fork is moving in one direction and closed during the time that it is moving in the other direction, and as the vibrations in opposite directions must be performed in equal times, it follows that the contact between lever D and stop $g$ must be alternately made and broken for an equal length of time, and this without reference to the amplitude of the vibrations of the fork.

The arrangement of the electric circuits in my apparatus is as follows: E is a main battery, one pole of which is connected with the earth at G, and the other with the front contact of a key, K, the rear contact of which is connected to the earth in the usual manner. From the lever of the key K a wire, 3, extends to the fork $a$, with the body of which it is electrically connected. The wire 4 extends from the stop $g$ to the point 5, which is the junction of the main and artificial lines, the former passing by wire 6 in one direction around the electro-magnet M of the receiving-instrument and thence by wire L to the distant station, and the latter passing by wire 7 in the opposite direction around the electro-magnet M and thence through rheostat R and wire 8 directly to the earth at G. A condenser, C, constructed, in the usual manner, of two sets of metallic sheets or plates interleaved with and insulated from each other, has one set of its plates connected by wire 9 with the point 5 and the other set by wire 10 with the earth.

The operation of my improved apparatus is as follows: If the rheotome A be set in action in the manner hereinbefore described, the main circuit will be alternately closed and broken with great rapidity between the lever D and stop $g$. Consequently, if the key K be depressed, a series of rapid pulsations will pass into the line, the route of which may be traced as follows: from the earth G by the wires 1 and 2 to the battery E, thence by the wire 3 to the tuning-fork $a$, thence through the contact-lever D, stop $g$, and wire 4 to the point 5. At this point the outgoing currents will divide into three portions, the first going by the wire 6 and line L to the distant station, the second by wire 7, rheostat R, and wire 8 to the earth at G at the home station, and the third entering and charging the condenser C by the wire 9. In this way the condenser at each pulsation takes a charge equal to, say, half the charge of the line-wire L. The instant the circuit is broken by the action of the rheotome between the lever D and the contact-stop $g$ the condenser discharges itself into the line, thus filling up the interval between the successive pulsations with discharges of like polarity, and producing a practically-continuous current at the distant end of the line so long as the key K remains depressed. At the same time the static charge induced upon the line during the transmission of a pulsation in its discharge serves to fill the interval between the successive pulsations, thus assisting to render the interrupted current at the sending-station a continuous one at the receiving-station.

I have found by experiment that in case the vibrations of the rheotome be sufficiently rapid in proportion to the capacity of the line the charge and discharge currents of the line will exactly neutralize each other without manifesting themselves at the terminal station, except as hereinbefore set forth.

As the outgoing pulsations pass in opposite directions around the home receiving-magnet M in the main and artificial lines respectively, as in the ordinary duplex apparatus, no effect will be produced thereupon, while at the same time the received currents coming in over the line L will either pass directly to the earth from the point 5 by the wires 4, 3, and 1, or else through wire 7, rheostat R, and wire 8, in which latter case, although they encounter the additional resistance of the rheostat R, which is approximately equal to that of the line, yet the effect is compensated upon the receiving-instrument, because the current passes through both coils of the electro-magnet M in the same direction, which thus receives the sum of the magnetic effects of both coils.

The number of convolutions of wire upon the receiving-magnet M, which are in the circuit of the artificial line, is made two, three, or more times as great as the number in the circuit of the main line, and the resistance of the rheostat is so adjusted as to exceed the resistance of the main line in the same or a similar proportion. The object of this arrangement is to cause the static discharge after each pulsation to tend toward the distant end of the cable, which it will do in consequence of the increased resistance at the home-station caused by the artificial line, which then forms a part of the main circuit. The electro-static induction in the cable also causes the rapid pulsations sent into the line to merge themselves into a practically-continuous current before reaching the distant end thereof. The lesser portion of the discharge which tends to return toward the home-station may be controlled by the rheostat R, so as to exactly compensate for the discharge, as in the first-described arrangement.

I do not desire to confine myself to the particular construction of the rheotome which I have herein shown and described. Any suitable form of tuning-fork, reed, or bar may be employed, or an automatic or mechanical circuit-breaker of any description actuated either by electro-magnetism or otherwise, the only necessary condition being that the making and breaking of the circuit shall be effected at a uniform rate of speed and at equal intervals of time. I do not, however, broadly claim the combination, with a main and artificial line, of a battery, an electrotome, and a key for connecting said battery simultaneously with the main and artificial lines through the rheotome, as I am aware that the same is not new.

I claim as my invention—

1. The combination, substantially as hereinbefore set forth, of a main line, an artificial or compensating line, a battery, an electrotome, a key for connecting said battery simultaneously to the main and artificial lines through the electrotome, and a condenser having one of its terminals connected directly to the main and artificial lines at their point of junction, and the other terminal with the earth.

2. The combination, substantially as hereinbefore set forth, of a main line, an artificial or compensating line, a battery, an electrotome, a key for connecting said battery to the main and artificial lines through the electrotome, a receiving-instrument upon which the currents in the main and artificial lines produce equal and opposite effects, and a condenser having one of its terminals connected directly to the main and artificial lines at their point of junction and the other terminal with the earth.

3. The combination, substantially as hereinbefore set forth, of an electro-magnet, a vibrating fork, reed, or armature, an automatic circuit-breaker actuated by the vibrations of said armature, and a rigid pivoted contact-lever for opening and closing a main-line circuit.

4. The combination, substantially as hereinbefore set forth, of a vibrating rheotome, and a rigid pivoted contact-lever mounted thereupon, and having a frictional connection therewith.

5. The combination, substantially as hereinbefore set forth, of a vibrating bar, a rigid contact-lever pivoted thereto at or near its center of gravity, and two fixed stops between which the said contact-lever plays for breaking and closing a telegraphic circuit.

In testimony whereof I have hereunto subscribed my name this 27th day of April, A. D. 1881.

STEPHEN DUDLEY FIELD.

Witnesses:
 MILLER C. EARL,
 CHAS. A. TERRY.